H. E. SCHANK.
SPROCKET MOUNTING.
APPLICATION FILED SEPT. 2, 1919.
1,410,724.
Patented Mar. 28, 1922.
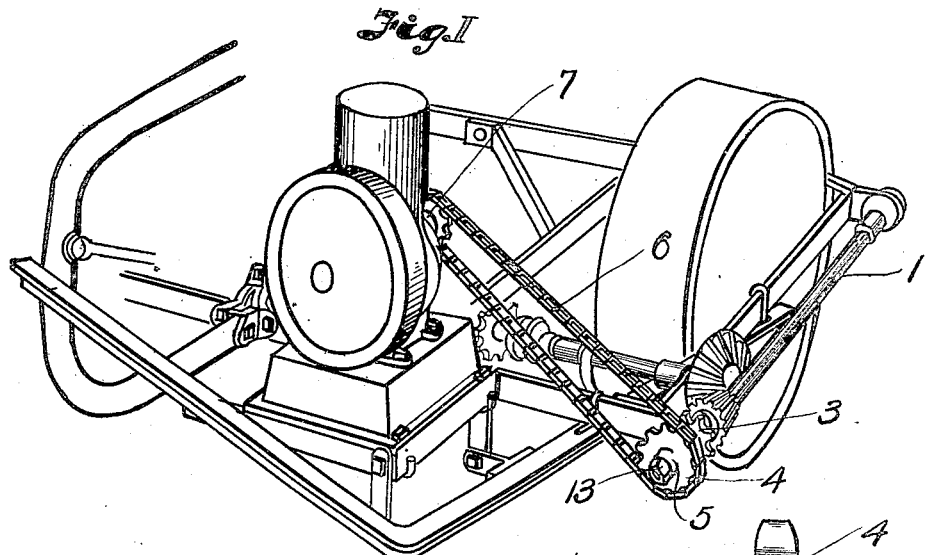
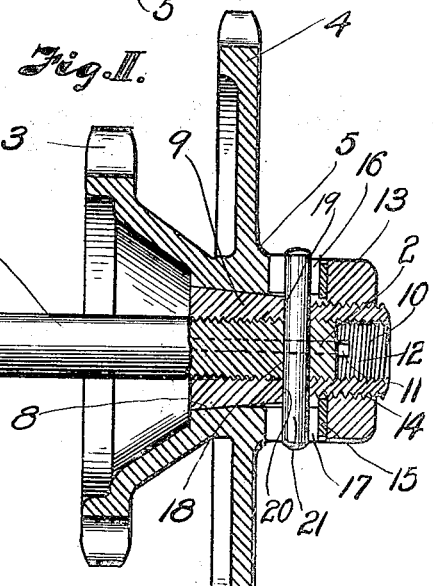
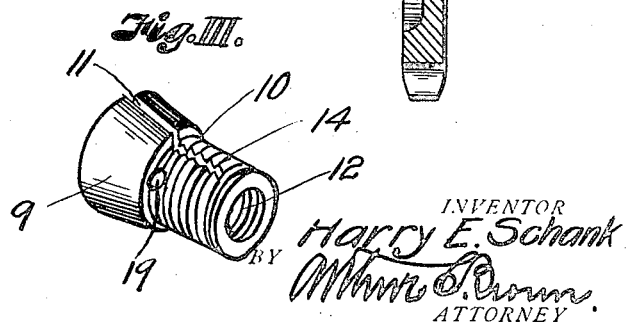
INVENTOR
Harry E. Schank
BY
ATTORNEY

UNITED STATES PATENT OFFICE.

HARRY E. SCHANK, OF TOPEKA, KANSAS, ASSIGNOR TO THE PIERSEN MANUFACTURING COMPANY, OF TOPEKA, KANSAS, A CORPORATION OF KANSAS.

SPROCKET MOUNTING.

1,410,724.   Specification of Letters Patent.   Patented Mar. 28, 1922.

Application filed September 2, 1919.   Serial No. 321,005.

*To all whom it may concern:*

Be it known that I, HARRY E. SCHANK, a citizen of the United States, residing at Topeka, in the county of Shawnee and State of Kansas, have invented certain new and useful Improvements in Sprocket Mountings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to sprocket mountings and more particularly to a sprocket mounting for use in connection with grain harvesters or like machines.

As an example of the adaptation of my invention, attention is directed to the fact that the main drive shaft of a harvester is usually driven from the bull wheel and motion is taken off the main drive shaft for operating the various mechanisms of which a harvester organization consists, through a sprocket wheel that is threaded onto the drive shaft and a belt run over said sprocket wheel and over a mating sprocket wheel on the harvester mechanism. The main drive shaft is provided with a threaded end on which is the sprocket wheel, and the threads on the shaft and sprocket are so pitched for a right hand harvester or a left hand harvester, as the case may be, that as the harvester shaft is rotated by the bull wheel, there is a tendency for the sprocket hub to screw more tightly upon the shaft.

Should it be desired to drive the harvester mechanism from an auxiliary power, such as a gas engine, the most simple and efficient method would be through a sprocket on the drive shaft and a belt running to the engine. It is apparent, however, that with both the engine and harvester mechanism sprockets on the same threaded portion of the shaft, rotation of the shaft from the bull wheel would tighten the sprockets on the shaft, but rotation of the engine connected sprocket from the engine would loosen the engine connected sprocket on the drive shaft.

It is, therefore, the principal object of this invention to provide a sprocket which will retain its mounting on a shaft whether the driving power is applied from the shaft or from the sprocket.

It is also an object of the invention to provide a sprocket of this character for use on harvester or other machines wherein the sprocket to which the auxiliary power is applied is integral with the sprocket through which the power is transmitted to the parts to be driven, and which may be substituted for the single sprocket ordinarily furnished with the harvester.

In accomplishing this object, I have provided the improved details of structure hereinafter described and illustrated in the accompanying drawings wherein:—

Fig. I is a fragmentary perspective view of the rear portion of a conventional harvester or binder, showing a sprocket wheel of my improved construction on the harvester shaft and operatively connected with an auxiliary power engine.

Fig. II is an enlarged sectional view of a sprocket hub and its attaching mechanism for the end of the harvester shaft, the shaft being shown in elevation.

Fig. III is a detail perspective view of a clamping sleeve for securing the hub to the shaft.

Referring now to the drawings by numerals of reference:

1 designates the harvester shaft, which is assembled in the ordinary manner in the harvester for the usual purpose and provided with a threaded end 2 upon which a sprocket wheel may be threaded in the ordinary manner. Instead of the usual single sprocket commonly found threaded on the end 2, and whereby the harvester mechanism is driven by rotation of the harvester shaft from the bull wheel, I provide the shaft with a double sprocket consisting of the toothed members 3 and 4, formed integral with the hub 5, the member 3 being adapted to be in driving connection with the operating parts of the harvester mechanism, as usual, and the member 4 being adapted to receive motion from a belt 6 driven from the auxiliary engine shaft 7. The sprocket hub 5 is provided with a conical bore 8 adapted to have longitudinal movement upon the conical head 9 of a split sleeve 10, upon which the hub is mounted and which threads onto the end of the harvester shaft; the sleeve having a longitudinal slit 11, rendering the head member resilient or yielding so that when the sleeve is threaded onto the shaft and the hub 5 is slid longitudinally upon the sleeve head, the internal threads 12 of the sleeve will be pressed into the external threads on the end 2 of the harvester shaft, and since the head 9 and the internal, conical portion of the hub 5 are adapted to have wedging engagement, the hub, the sleeve, and the threaded portion of shaft 1 will be firmly locked together, the hub and sleeve by friction between their conical meeting faces and the sleeve and shaft by the frictional engagement of their threaded portions. The hub of the sprocket is drawn onto the sleeve by a nut 13 which threads onto the end of sleeve 10 and bears against the end of the hub, to initially seat the sprocket and hold the same in its locked relation to the shaft, there preferably being a washer 15 interposed between the end of the nut and the end of the hub 5.

In assembling the device, the sleeve will generally be positioned in the sprocket hub and then screwed upon the threaded portion 2 of shaft 1. The nut 13 may then be screwed on the threads 14 of the sleeve and, bearing against the hub, impart enough longitudinal movement to the hub 5 to contract the split head 9 into gripping engagement with the threads on the part 2 of the shaft 1. Therefore, it will be immaterial in which direction the power is applied to the sprockets, the locking engagement being insured by friction.

In the form shown in Fig. II the hub is provided with aligning openings 16 and 17 which are preferably slightly elongated and which are adapted to align with openings 18 in the spindle or shaft 1, 19 and 20 in the sleeve, whereby a pin 21 may be driven to prevent accidental releasing of the sprocket hub 5, even in the event that it becomes loose, the elongation of the openings 16 and 17 permitting the hub to be moved along the pin 21 when the sprocket is forced to its seat by the nut 13.

From the foregoing it will be apparent that the shaft may be adapted to be driven from an auxiliary power as, for example, an engine, through the medium of a sprocket without the necessity of materially changing any of the present parts on the harvester except to relieve the driving shaft from the necessity of being driven by the bull wheel and substituting a special form of sprocket and hub for the one generally found on the harvester.

While I have described my invention as applied to a specific type of wheel and as adapted for a specific use, it is apparent that such description is merely for illustration and not intended as a limitation of the scope of the invention.

What I claim and desire to secure by Letters-Patent is:

1. In combination with a shaft having a threaded end, a split sleeve mounted upon the threaded end of the shaft, a hub upon the split sleeve, the hub and split sleeve and the shaft having aligning openings, a pin projectable through said openings, and a nut on the sleeve to abut against the end of the hub.

2. In combination with a shaft having a threaded end, a split sleeve mounted upon the threaded end of the shaft, a hub upon the split sleeve, the hub and split sleeve and the shaft having aligning openings, a pin projectable through said openings, and a nut on the sleeve to abut against the end of the hub, the openings in the hub being elongated to permit longitudinal movement of the hub on the sleeve.

In testimony whereof I affix my signature.

HARRY E. SCHANK.